United States Patent [19]
Zdaniewski

[11] 3,839,280
[45] Oct. 1, 1974

[54] CURABLE SILOXANE RESIN COMPOSITIONS

[75] Inventor: Joseph J. Zdaniewski, Scotia, N.Y.

[73] Assignee: General Electric Company, Waterford, N.Y.

[22] Filed: Apr. 30, 1973

[21] Appl. No.: 356,048

Related U.S. Application Data

[63] Continuation of Ser. No. 167,027, July 28, 1971, abandoned.

[52] U.S. Cl........ 260/46.5 R, 260/18 S, 260/37 SB, 260/46.5 G, 260/825, 264/141
[51] Int. Cl. ........................................... C08f 11/04
[58] Field of Search.......... 260/46.5 R, 46.5 G, 825, 260/37 SB

[56] References Cited
UNITED STATES PATENTS

| | | | |
|---|---|---|---|
| 3,627,729 | 12/1971 | Trego | 260/46.5 G |
| 3,666,830 | 5/1972 | Alekna | 260/825 |

Primary Examiner—Melvyn I. Marquis
Attorney, Agent, or Firm—Donald J. Voss, Esq; Granville M. Pine, Esq.; Edward A. Hedman, Esq.

[57] ABSTRACT

A composition containing an uncured siloxane resin, and a catalyst system comprising a lead compound and a carboxylic acid anhydride. The composition is particularly useful as a molding compound such as in the transfer molding of transistor housings.

8 Claims, No Drawings

CURABLE SILOXANE RESIN COMPOSITIONS

This application is a continuation of application Ser. No. 167,027, filed July 28, 1971 and now abandoned.

BACKGROUND OF INVENTION

This invention relates to improved catalyzed silicone resin compositions and particularly silicone compositions which are useful as molding compounds.

In preparing silicone resin molding compounds, one needs to blend silicone resin, catalyst, and, if desired, filler. Since silicone resins are generally hard and brittle at room temperature, it is necessary to heat the resin while the filler, if used, and catalyst are being mixed therewith in order to soften the resin sufficiently to permit uniform blending. A problem, however, arises in that heating the resin in the presence of the curing catalyst during mixing causes the resin to cure, as these resin systems are thermosetting. When such a heated catalyzed resin system is used in a transfer molding operation, the hot fluid catalyzed resin must be fluid enough to pass through the small transfer molding channel to the mold without gelling or setting in the channel, through the mold cavity without gelling or setting before the cavity is completely filled, and then cured shortly thereafter in order that the molding process be rapid.

A considerable amount of work has previously been conducted to provide silicone resin catalyst systems which permit a silicone resin molding compound to be heated until it is fluid without danger of curing, but provide a fast cure of the resin system at a temperature slightly above the flow temperature of the resin but below a temperature which would degrade the physical properties of the cured resin.

For example, there have been suggestions, such as U.S. Pat. No. 3,208,961 to Kookootsedes, to employ a catalyst combination which consists essentially of either lead monoxide or lead carbonate and a carboxylic acid or ammonium salt thereof as a catalyst for certain phenyl siloxane resins. The shelf life and gel times of such compositions, however, are not entirely satisfactory and could stand improvement. It would therefore be desirable to increase the shelf life and the initial and final gel times of such compositions to provide a silicone composition which possesses not only rapid cure times but also relatively long shelf life and relatively long initial and final gel times.

However, since the properties of long shelf life and long initial and final gelling times are contradictory to the property of fast cure time, the improvement of one of these properties is generally accomplished at the expense of a deterioration of another property. That is, usually attempts carried out to decrease the cure time will also result in a decrease in the shelf life and/or gel times of the composition. Likewise, attempts to increase the initial and final gel times and/or shelf life are usually accompanied by an increase in the cure time of the composition.

An object of the present invention is to provide curable silicone compositions which possess the desired combination of long shelf life, long initial gel time, long final gel time, and rapid cure times, along with excellent physical properties such as hot strength.

According to the present invention, a curable polysiloxane resin composition is provided which possesses increased initial and final gel times and shelf life without sacrificing the rapid cure times achievable when using a lead carbonate or lead monoxide with a carboxylic acid or ammonium salt thereof. The increased gel times, in turn, provide for improved filling of the mold cavities. Also, quite surprisingly the compositions of the present invention have improved hot strength as compared to these prior art compositions.

BRIEF DESCRIPTION OF INVENTION

The thermosetting silicone resin compositions of this invention comprise an intimate mixture of (a) an uncured silicone resin containing at least 0.25 percent by weight of silicon-bonded hydroxyl groups or lower alkoxy groups having one to eight carbon atoms per group, and a catalytic amount of (b) a catalyst composition containing (1) lead carbonate and/or lead monoxide, and (2) carboxylic acid anhydride.

DESCRIPTION OF PREFERRED EMBODIMENTS

The lead compound employed in the compositions of the present invention can be lead monoxide, lead carbonate or mixtures thereof. The lead monoxide which can be used in the catalyst composition can be any of the well known forms. It is preferred, however, that the red crystalline form be employed. The particle size of the lead monoxide and/or lead carbonate that is used can vary over a wide range. For example, in commercially available lead monoxides the size of the particles are from about 1 to 200 microns. It is preferable, however, that the majority of the particles of the lead monoxide employed have a particle size in the range of 5 to 15 microns. Lead monoxides having particle sizes larger or smaller than the commercially available materials can be used but are not preferred. The amount of lead monoxide or lead carbonate used is generally from about 0.01 to about 5 percent and preferably from about 0.1 to about 1 percent by weight based upon the total weight of the uncured silioxane resin and the catalyst system of the lead compound and anhydride.

Suitable anhydrides of organic carboxylic acids useful in the present invention include anhydrides of saturated and unsaturated aliphatic carboxylic acids; anhydrides of aromatic carboxylic acids; anhydrides of cycloaliphatic carboxylic acids; and anhydrides of substituted carboxylic acids such as halo substituted organic carboxylic acids. The carboxylic acids can be mono or polycarboxylic acids, but preferably are monocarboxylic acids, particularly because the monocarboxylic acids seem to provide somewhat better hot strength characteristics than do the polycarboxylic acids. In addition, it is recognized that the anhydrides suitable for the present invention can be obtained from mixtures of carboxylic acids. Such mixtures could include different saturated and/or unsaturated aliphatic carboxylic acids; different cycloaliphatic carboxylic acids; different aromatic carboxylic acids; or an aromatic carboxylic acid and an aliphatic carboxylic acid.

Usually the aliphatic acids from which suitable anhydrides can be obtained contain up to about 22 carbon atoms such as acetic acid, citraconic acid, maleic acid, propionic acid, n-butyric acid, 2,3-dimethyl maleic acid, stearic acid, itaconic acid, succinic acid, n-decyl succinic acid, and methyl succinic acid. The cycloaliphatic acids from which suitable anhydrides can be obtained generally contain four to six carbon atoms in the cycloaliphatic ring such as cyclobutane carboxylic acid, 1,2,3,4cyclopentanetetracarboxylic acid, 1,2-cyclohexane dicarboxylic acid, and 4-cyclohexene-1,2-dicarboxylic acid. The aromatic acids from which suitable anhydrides can be derived can be mononuclear such as benzoic acid, terephthalic acid, and pyromellitic acid, or polynuclear such as 1,8-naphthalic acid.

Some examples of suitable anhydrides of carboxylic acids; include acetic anhydride, pyromellitic dianhydride, benzoic anhydride, bromomaleic anhydride, n-butyric anhydride, chloromaleic anhydride, citraconic anhydride, cyclobutane carboxylic acid anhydride, 1,2-cyclohexane dicarboxylic anhydride, 4-cyclohexene-1,2-dicarboxylic anhydride, 1,2,3,4-cyclopentanetetracarboxylic dianhydride, n-decyl succinic anhydride, 2,3-dimethyl maleic anhydride, itaconic anhydride, maleic anhydride, methyl succinic anhydride, 1,8-naphthalic anhydride, propionic anhydride, tetrachlorophthalic anhydride, 3,4,5,6-tetrahydrophthalic anhydride, stearic anhydride, and the mixed anhydride of acetic and benzoic acids. The preferred anhydrides are benzoic anhydride, stearic anhydride, and acetic anhydride with the most preferred being benzoic anhydride. The particular anhydride to be employed can be selected according to its decomposition temperature so that it becomes an active portion of the catalyst system at or near the desired cure temperature for the resin, and/or can be selected according to a desired cure rate.

The anhydride of the carboxylic acid should be present in the composition in an amount sufficient to provide at least about 0.25 of the carboxylic acid anhydride group,

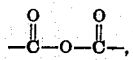

and preferably at least about 0.35 of the carboxylic acid anhydride group per mole of the lead compound. Of course, the anhydride can be employed in amounts in excess of the above-mentioned threshold quantities. For instance, the anhydride can be present in an amount sufficient to supply at least 3.5 carboxylic acid anhydride groups per mole of the lead compound. Accordingly, the weight of the anhydride to be used based upon the total composition will depend upon the molecular weight of the anhydride employed and the number of anhydride groups present in the anhydride.

The siloxane resins that can be used in the composition of this invention are well known materials. By the term "siloxane resin," it is meant polymers containing two or more siloxane units, and having the average unit formula

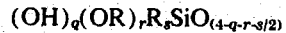

where R is selected from the class comprising lower alkyl radicals having one to eight carbon atoms; cycloalkyl radicals having five to seven carbon atoms in the ring; lower alkenyl radicals having two to eight carbon atoms; mononuclear aryl radicals; mononuclear aryl lower alkyl radicals having one to six carbon atoms in the alkyl group; and halogenated derivatives of the above radicals; OR is a lower alkoxy radical containing from one to eight carbon atoms per radical; $s$ has a value of 1.0 to 1.8 and preferably has a value of 1.05 to 1.45; $q$ has a value of 0 to 1.0 and preferably a value of 0.2 to 0.55; $r$ has a value of 0 to 1.0 and preferably has a value of 0.2 to 0.55 and the sum of $q + r$ has a value of 0.01 to 1.0 and preferably has a value of 0.2 to 0.55.

Examples of siloxane units that can be present in the siloxane resins are

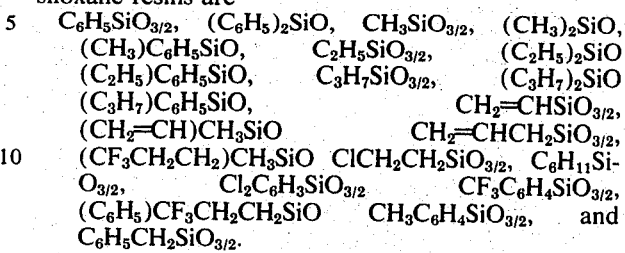

More specifically, R is selected from the class consisting of lower alkyl radicals, e.g., methyl, ethyl, propyl, butyl, and octyl radicals; cycloalkyl radicals having five to seven carbon atoms in the ring, e.g., cyclopentyl, cyclohexyl, and cycloheptyl radicals; lower alkenyl radicals, e.g., vinyl and allyl radicals; mononuclear aryl, e.g., phenyl, tolyl and xylyl; mononuclear aryl lower alkyl radicals, e.g., benzyl and phenylethyl radicals; and halogenated derivatives of the above radicals, e.g., chloromethyl, beta-chloroethyl, chlorophenyl, dibromophenyl and trifluoromethylethyl radicals. Preferably, R is selected from the class consisting of methyl, ethyl, and phenyl.

The lower alkoxy radical, OR, is selected from the class consisting of lower alkoxy radicals having one to eight carbon atoms, e.g., methoxy, ethoxy, propoxy and isopropoxy radicals and is preferably selected from the class consisting of the above specifically named radicals.

The ratio of the organic substituents, R, to the silicon atoms in the above-described siloxane resin must be in the range of 1.0:1 to 1.8:1. Preferably, the resin has a phenyl to silicon ratio of 0.5:1 to 0.7:1, and other substituents to silicon ratio of 0.5:1 to 0.1:1, and a total phenyl and other substituents to silicon ratio of 1.05:1 to 1.45:1. The preferred resins of this invention are the phenylmethylsiloxane resins, i.e., resins containing siloxane units containing phenyl groups, and siloxane units containing methyl groups. The preferred resin contains some siloxane units having two monovalent hydrocarbon substituents per siloxane unit as this adds flexibility to the cured resin. Preferably, from 5 to 45 percent of the siloxane units contain two monovalent hydrocarbon substituents per siloxane unit.

In addition, the resin must contain at least 0.25 percent by weight of silicon-bonded OH and/or (OR) groups. The resin can contain a much higher percentage of OH groups and preferably contains at least 5 weight per cent of OH groups. It is preferable that 90 percent of the total OH and (OR) groups be OH groups. The (OR) groups are lower alkoxy groups having up to eight carbon atoms, such as methoxy, ethoxy and isopropoxy groups. The presence of such groups as methylsiloxy groups in the resin aids in regulating the cure time of the resin. As the ratio of alkoxy groups to siloxy groups increases the cure time increases.

Silicone resins which may be used in the practice of the present invention, generally speaking, are well known in the art. For example, see U.S. Pat. Nos. 2,646,441 of Duane, 3,135,713 of Brewer, et al, and U.S. Pat. No. 3,389,114 of Burzynski, et al, and the discussion therein.

The preferred resins for use in the practice of the present invention are those having a silanol (measured as OH) content of 5 to 7 percent by weight. The method of making such resins is generally set forth in U.S. Pat. application, Ser. No. 671,574 of Duane F. Merrill, filed Sept. 29, 1967, and now abandoned entitled "Silanol-Containing Organopolysiloxane Resins and a Method for Making Them." In addition, the preferred resins also contain some siloxy groups which are substituted with one methyl radical per siloxy unit and these mono-substituted siloxy units also contain some alkoxy substitution. It is the siloxy units in the resin which are mono-substituted with methyl groups and which also contain some alkoxy substitution which regulate the cure time of the resin. If the resin contains over 5 percent silanol by weight and contains no alkoxy groups, the cure time of the resin at high temperatures can be so fast that it would be impractical to use such resin in transfer or injection molding operations.

Silanol-containing organopolysiloxane resins having a silanol content of 5 percent to 11 or 12 percent can be made by hydrolyzing organohalosilanes utilizing a water immiscible organic solvent and acetone as a co-solvent. The method involves agitating a mixture comprising (A) organohalosilane preferably in combination with a lower alkyltrialkoxysilane, (B) water, (C) acetone, (D) a water immiscible organic solvent, and (E) an aliphatic monohydric alcohol having from one to eight carbon atoms where there is present by weight in said mixture, per part by weight of (A), 1.7 to 10 parts of (B), 0.2 to 5 parts of (C), and 0.3 to 5 parts of (D), and from 0 to 1 mole of (E) per mole of halogen attached to silicon of (A), (2) separating an organic solvent solution of (F) from the resulting hydrolysis of (1), where (F) is a silanol-containing organopolysiloxane having an average ratio of from about 1 to 1.8 organo radicals per silicon atom, and (A) is selected from, a. organotrihalosilane,
b. a mixture of organotrihalosilane and diorganodihalosilane,
c. the reaction product of (E) and a member selected from (a) and (b), which has an average ratio of up to 1 alkoxy radical per halogen radical,
d. a mixture of (c) and a member selected from (a) or (b), and where the organo radicals of (A) and (F) are attached to silicon by carbon-silicon linkages and are selected from monovalent hydrocarbon radicals, halogenated monovalent hydrocarbon radicals, and cyanoalkyl radicals.

Included by the organohalosilanes which can be employed in the practice of the invention are silanes of the formula, (1) $(R^1)_a SiX_{4-a}$, 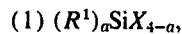

where $R^1$ is selected from the same class as $R$, $X$ is a halogen radical, such as chloro, and $a$ is an integer having a value of 1 or 2. In addition, there can be employed in combination with such organohalosilanes of formula (1), an aliphatic monohydric alcohol of the formula, (2) $R'OH$, 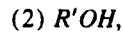

or an alkoxylated organosilane of the formula, (3) $(R^2)_a(RO)_b SiX_{4-a-b}$ 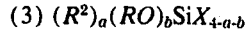

where $R^2$ is selected from the same class as $R$; $X$ and $a$ are as defined above; $b$ is an integer equal to 1 to 3, inclusive; and the sum of $a$ and $b$ is equal to 2 to 4, inclusive.

Included by the organohalosilanes of formula (1) are for example, methyltrichlorosilane, dimethyldichlorosilane, methylphenyldichlorosilane, phenyltrichlorosilane, diphenyldichlorosilane, etc. Included by the partially alkoxylated organohalosilanes of formula (3), are reaction products of organohalosilanes of formula (1), where $R^2$ is preferably selected from the class consisting of monovalent hydrocarbon radicals and halogenated monovalent hydrocarbon radicals, with alcohols of formula (2) such as methyl alcohol, ethyl alcohol, propyl alcohol, isopropyl alcohol, butyl alcohol, etc.

In instances where the aliphatic monohydric alcohol of formula (2) is utilized in the practice of the invention, the alcohol can be added directly to the organohalosilane of formula (1) before hydrolysis, or it can be added to the hydrolysis mixture prior to the addition of the organosilane. As a result, the silanol-containing organopolysiloxane of the present invention can be free of or contain chemically combined alkoxy radicals attached to silicon.

The preferred uncured silicone resins of the present invention can have from 4 to 11 percent and preferably from 5 to 7 percent by weight of hydroxy radicals attached to silicon. These resins are friable fast curing molding materials when at 100 percent solids. Experience has shown that in most instances, the average ratio of the $R^1$ radicals to silicon will determine the nature of the resin and its utility. For example, resins at 100 percent solids, having an average ratio of about 1 to about 1.2 $R^1$ radicals per silicon atom, a silanol content of from 4 to 11 percent by weight, with or without chemically combined alkoxy radicals, are generally friable, and suitable for molding applications. These moldable materials have been found to soften at temperatures as low as 60° C, and generally flow at temperatures between 70° – 90° C.

In accordance with the method of the invention, hydrolysis is achieved by agitating the organohalosilane in the presence of water, acetone, and organic solvent. The organic layer is separated from the acid layer which forms during hydrolysis. The organic phase then is stripped to produce a 100 percent solids resin.

Although the order of addition of the various ingredients is not critical, it is preferred to add the organohalosilane to the mixture of water, acetone, and organic solvent. Preferably, a proportion of from 2 to 6 parts of water, 0.3 to 2 parts of acetone, and 0.6 to 2 parts of organic solvent, per part of organohalosilane can be employed. Suitable organic solvents are for example, any water immiscible organic solvent which is inert to the hydrolysis reactants during hydrolysis, and in which the hydrolyzate is soluble, to provide for its separation from the aqueous layer. For example, there can be employed a hydrocarbon such as benzene, toluene, xylene, etc., esters such as butyl acetate and ethyl acetate; ethers such as diethyl ether, dioxane, etc. During the addition, the mixture is agitated to provide for a sufficient degree of hydrolysis of the organohalosilane and formation of the organopolysiloxane hydrolyzate. The temperature of the hydrolysis mixture can be controlled by the rate of addition, or external heat or cooling can be employed if desired. During hydrolysis, a temperature between 0° to 80° C has been found effective, while a temperature between 20° to 40° C is preferred. After the addition has been completed, the mixture can be stirred for an additional period of time, such as 30 minutes or more to allow for complete hydrolysis of the organohalosilanes. The mixture is then allowed to settle and the acid layer can be drawn off from the organic layer. The organic layer can then be stripped of solvent to 100 percent solids.

When making molding resins, it has been found expedient to strip under reduced pressure, such as a pressure between 25 mm to 50 mm Hg. to a solids concentration of from 50 to 70 percent by weight of the resin solution. Resin impurities can be removed at this solids concentration, such as by filtration, centrifuging, etc. Further stripping can be employed to 100 percent solids at a temperature sufficient to remove all of the residual solvent. For example, when stripping toluene, a temperature up to 130° C has been found effective.

In instances where the average $R^1$ to Si ratio is above 1.2, for example, 1.2 to 1.4 or 1.4 to 1.8, it is preferred to strip at atmospheric pressure to a solids concentration of up to about 95 percent. If it is desired, the resin can be refluxed 2 to 3 hours at temperature between 190° to 230° C, to further improve the characteristics of the resin.

In addition to the above ingredients, other silicon containing materials such as silanes or low molecular weight polysiloxane fluids containing alkoxy and/or silanol groups can be included in the composition. Generally speaking, silanes which can be employed are those falling within the scope of the formula

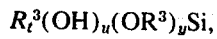

wherein $R^3$ is selected from the same class as $R$ and $(OR^3)$ is selected from the same class as $(OR)$ as defined above; $t$ has a value of 1 to 3; $u$ has a value of 0 to 3; $v$ has a value of 0 to 3; and the sum of $u$ and $v$ has a value of 1 to 3.

Examples of polysiloxane fluids which can be used are:

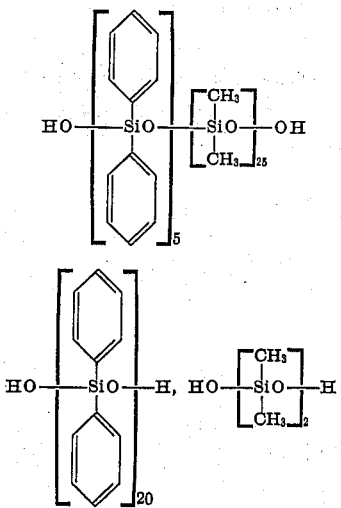

Generally speaking, siloxane compounds which can be employed are those falling within the scope of the formula

where $R^4$ is selected from the same class as $R$ and $(OR^4)$ is selected from the same class as $(OR)$; $x$ has a value of 1 to 3; $y$ has a value of 0 to 2; $z$ has a value of 0 to 2, and the sum of $y + z$ has a value of 0.02 to 2. When $x$ has a value of less than 1.8, there must be at least 5 percent by weight of HO and $(OR^4)$ groups in the siloxane compound. It is preferable that $z$ have a value of 0.

The silane or low molecular weight siloxane fluid may act as a complexing agent for the lead compound of the catalyst at higher temperatures, and thereby aiding in the cure of the siloxane resin. Moreover, the silane or siloxane fluid acts as a plasticizer in the compositions.

The selection of the particular silane or low molecular weight siloxane fluid, if employed, depends in part on the length of storage, i.e., a more volatile material will be lost to a greater degree on storage than a less volatile material, on the degree of plasticity desired in the final cast resin, and the silanol content of the casting resin. For instance, when the silanol or alkoxy content of the resin is relatively high, the silanol or alkoxy content of silane or fluid is usually relatively low. It is preferred, however, to use a silanol containing polysiloxane fluid since such are exceptionally good plasticizers for the casting resins employed in the present invention. When used, the silane or siloxane fluid preferably is present in amounts from about 0.5 to about 10 percent and most preferably from about 1 to about 8 percent by weight based upon the total weight of the siloxane resin, the silane and/or siloxane fluid, and the catalyst system of the lead compound and anhydride.

Also, if desired, fillers and pigments can be added to the uncured resin to increase the strength of the cured resin, reduce crazing, make a more attractive product, etc. The particular pigment or filler employed in the composition of this invention is not critical but fillers which have a catalytic effect in themselves toward the resin of this invention should be avoided. Alkaline fillers in large quantities and strongly acidic fillers should be particularly avoided as should other fillers which exert a catalytic effect on the condensation of the silicone resin. Some inert fillers which are suitable are ground glass, diatomaceous earth, crushed quartz, fume silica, precipitated silica, magnesium silicate, zirconium silicate, and aluminum silicate. The preferred fillers are zirconium silicate, chopped glass fibers, aluminum oxide and fused silica. The amount of filler present in the resin can vary from 0 percent up to the point where the filler concentration is so high that it interferes with the flow properties of the molding resin. This point is, of course, a function of the type of resin, the type and amount of plasticizer present, and the porosity of the filler.

In addition to the above ingredients, varying amounts of conventional additives including release agents such as calcium or aluminum stearate and preservatives can be employed in the composition.

The procedure generally followed in making the compositions of the present invention generally involves the following steps:

1. The materials which are to be added to the resin are blended together, e.g., fillers such as glass fibers mixed with silica filler and a release agent such as calcium stearate, along with color pigments and catalyst such as lead carbonate and benzoic anhydride in a high speed blade mixer at a speed on the order of 4,000 rpm for approximately 4 minutes.

After the ingredients are thoroughly mixed, the silicone resin is added to the mixer and is mixed in with the other components at a speed of about 2,000 rpm for approximately 2 minutes. The molding compound is then made by transferring the blend from the mixer into a double screw conveyor which feeds a rotor mixer. A temperature on the order of 80° to 100° C is employed and a rotor speed in the neighborhood of 500 ± 100 rpm is employed.

2. A silane or siloxane fluid such as a silanol end-stopped polysiloxane containing both dimethylsiloxy and diphenylsiloxy units is then pumped into the mixture in the rotor chamber. The output of the rotor mixer which has been fluidized by the heat generated in the mixer is fed between two rollers where it is formed into a solid sheet. The sheet is cooled to room temperature and granulated in a grinder to a particle size of approximately 10 mesh. This 10 mesh particle size molding compound can be used, as is in an injection, transfer or compression molding apparatus or can be pelletized before use in such molding apparatus.

Of course, other procedures can be used to blend the ingredients of the composition as long as a substantially uniform blend is obtained. The temperatures employed during the compounding should be controlled so as not to cause decomposition of the anhydride.

The following examples wherein all parts are by weight unless stated to the contrary are illustrative of the practice of the present invention.

Example 1

This example describes the manufacture of a molding resin and the use of the molding resin in a transfer molding operation to make a transistor housing.

A silane blend composed of 220 parts of methyltriisopropoxysilane, 260 parts of methyltrichlorosilane, 470 parts of phenyltrichlorosilane, and 50 parts of dimethyldichlorosilane is hydrolyzed in a mixture of toluene, acetone and water. For every thousand parts of the silane blend, there is 4,547 parts of the toluene-acetone-water mixture. The mixture is composed of 825 parts of toluene, 722 parts of acetone and 3,000 parts of water.

The hydrolysis is carried out by adding the silane blend to a preheated mixture of the toluene, acetone and water. The silane blend is added over a 25-minute period, during which time the temperature of the hydrolysis mixture goes from 25° to 70° C. After the silane addition is completed, the hydrolyzate is agitated for 5 minutes. The agitation is stopped and the layers separate very rapidly. As soon as the separation is completed, the resin is transferred into a bodying kettle and vacuum stripped at 40° C to a solids content of 50 percent.

The resin which is formed by the aforedescribed hydrolysis process is then vacuum dried using a continuous film evaporator. When all of the solvent is removed, the resin is then cast, cooled to room temperature, and ground to a fine powder. The resin should not be exposed to any appreciable amount of atmospheric moisture as it picks up water which causes gassing when the resin is used in a molding operation. It is also necessary to perform the entire hydrolysis, drying and grinding operation in equipment which does not add any catalytic metal, especially iron, to the high silanol resin. In the present example, as much of the equipment as is possible is glass-lined.

A molding compound is made by adding to a high speed blade mixer, 146 parts of chopped glass fibers, 146 parts of silica filler, 3 parts of a disilazane treated colloidal silica (MS—7), 0.6 parts carbon black, 0.6 parts benzoic anhydride, and 0.5 parts of lead carbonate. The components are mixed in a high speed blade mixer at a blade speed of 4,000 rpm for 4 minutes. After the ingredients are thoroughly mixed, 112 parts of the above-described resin is added to the mixture and is mixed in with the other components at a speed of 2,000 rpm for 2 minutes. The blend which is formed is then transferred from the mixer into a double screw conveyor which feeds a rotor mixer. A screw chamber temperature of 90° C and a rotor speed of 500 rpm is applied. Into the mixture in the rotor chamber is then pumped 10 parts of a silanol stopped dimethylpolysiloxane fluid containing 12 mole percent of diphenyl polysiloxane units, and having a viscosity of 12,000 cps. The output of the rotor mixer which is fluidized by the heat generated in the mixer is then fed between two rollers where it is formed into a solid sheet. The sheet is cooled to room temperature and granulated in a grinder to a particle size of approximately 10 mesh. The molding compound which is formed by the above method is then used in a transfer molding apparatus to form transistor bodies. This involves heating the molding compound to 150° C, transferring the molten molding compound through the channels of a molding apparatus and into a mold cavity which is heated to 175° C. The resin is allowed to cure in the mold cavity for 2 minutes. The transistor casing which is formed is then removed and is perfectly formed having no voids or blow holes. The transistor is then baked for 2 hours at 200° C to eliminate any traces of moisture or gases which are formed during the molding operation. The transistor is then used in an electronic circuit and found to have excellent electrical properties.

The molding compound which is formed by the above method has the following properties as tested at 350° F:

| | |
|---|---|
| Initial gel time | 42 seconds |
| Final gel time | 58 seconds |
| Hot Hardness After Molding (Shore D Scale) | |
| After 2½ minutes | 68–70 |
| After 1½ minutes | 58–60 |
| Hull Spiral Flow (20 gm powder sample at 809 psi) | 37 inches |

Example 2

The preparation of the molding compound of Example 1 is repeated except that the benzoic anhydride is replaced with 0.6 parts of benzoic acid.

The molding compound which is formed in this example has the following properties as tested at 350° F:

| | |
|---|---|
| Initial gel time | 24 seconds |
| Final gel time | 34 seconds |
| Hot Hardness After Molding (Shore D Scale) | |
| After 2½ minutes | 64–67 |
| After 1½ minutes | 56 |
| Hull Spiral Flow (25 gm powder sample at 809 psi) | 38 inches |

A comparison of Examples 1 and 2 clearly demonstrates the significant improvement in both the initial and final gel times obtained when an anhydride is employed in place of the corresponding carboxylic acid according to the present invention. Moreover, a comparison of Examples 1 and 2 clearly shows the improvement in hot strength due to the use of the anhydride in place of the acid.

Example 3

Example 2 is repeated except that the amount of lead carbonate is 0.35 parts.

The molding compound produced according to this example has the following properties as tested at 350° F:

| | |
|---|---|
| Initial gel time | 44 seconds |
| Final gel time | 60 seconds |
| Hot Hardness After Molding (Shore D Scale) | |
| After 2½ minutes | 60–63 |
| After 1½ minutes | 40–42 |
| Hull Spiral Flow (20 gm powder sample at 809 psi) | 36 inches |

Example 3 demonstrates that improvement in gel times obtained by methods outside the scope of the present invention is accompanied by a significant loss in hot hardness at 1½ and 2½ minutes which further indicates the need for a longer cure time for such compositions to try to raise the hot hardness to an acceptable value.

Example 4

Into a high speed blade mixer are added 100 parts of the siloxane resin of Example 1, 0.1 parts of lead carbonate and 0.1 parts of benzoic anhydride. The above ingredients are blended together in the high speed mixer until the mixture is homogeneous. The composition is then milled on a two-roll mill at a temperature of 100° C for 5 minutes. The resulting composition is cooled to 25° C and granulated. The composition has a final gel time at 200° C of 68 seconds.

Example 4 is repeated except that the 0.1 parts of benzoic anhydride are replaced by 0.1 parts of benzoic acid. This composition has a final gel time of 117 seconds.

Example 5

A molding compound is made by adding to a high speed blade mixture, 146 parts of chopped glass fibers, 146 parts of silica filler, 3 parts of a disilazane treated colloidal silica (MS—7), 0.42 parts of lead monoxide, 0.6 parts carbon black, and 0.6 parts benzoic anhydride. The components are mixed in a high speed blade mixer at a blade speed of 4,000 rpm for 4 minutes. After the ingredients are thoroughly mixed, 112 parts of the resin of Example 1 is added to the mixture and is mixed in with the other components at a speed of 2,000 rpm for 2 minutes. The blend which is formed is then transferred from the mixer into a double screw conveyor which feeds a rotor mixer. A screw chamber of temperature of 90° C in a rotor speed of 500 rpm is applied. Into the mixture in the rotor chamber is then pumped 10 parts of a silanol stopped dimethyl polysiloxane fluid containing 12 mole percent diphenyl polysiloxane units, and having a viscosity of 12,000 cps. The output of the rotor mixer which has been fluidized by the heat generated in the mixer is then fed between two rollers where it is formed into a solid sheet. The sheet is cooled to room temperature and granulated in a grinder into a particle size of approximately 10 mesh. The molding compound which is formed by the above method is then used in a transfer molding apparatus to form transistor bodies, as described in Example 1. The molding compound of this example has properties similar to those of the molding compound of Example 1.

Example 6

Into a high speed blade mixer are added 40 parts of the resin of Example 1, 60 parts of ⅛ inch Owens Corning hammer milled fiberglass, 60 parts of 325 mesh fused silica, 1 part of calcium stearate, 0.2 parts of lead carbonate, 0.6 parts of stearic anhydride, and 1 part of diphenyl silane diol. All the above ingredients are blended together in the high speed mixer until the mixture is homogeneous. The composition is then milled on a two-roll mill at a temperature of 100° C for 5 minutes. The resulting composition is cooled to 25° C and granulated. The composition is then used in a transfer molding apparatus to form transistor bodies.

Example 6 is repeated except that the 0.6 parts of stearic anhydride are replaced with 0.6 parts of stearic acid.

The comparative properties of the composition of this example employing the anhydride and the one employing the acid are similar in nature to the comparative properties of Examples 1 and 2, respectively.

Example 7

Into a high speed blade mixer are added 40 parts of the resin of Example 1, 60 parts of ⅛ Owens Corning Hammer milled fiberglass, 60 parts of 325 mesh fused silica, 1 part of calcium stearate, 0.2 parts of lead carbonate, and 0.1 parts of acetic anhydride, and 1 part of diphenyl silane diol. All the above ingredients are blended together in a high speed blade mixer until the mixture is homogeneous. The composition is then milled on a two-roll mill at a temperature of 100° C for 5 minutes, the resulting composition is cooled to 25° C and granulated. The composition is useful in transfer molding apparatus to form transistor bodies.

Example 7 is repeated except that the 0.1 parts of acetic anhydride are replaced with 0.1 parts of acetic acid.

The comparative properties of the composition of this example employing the anhydride and the one employing the acid are similar in nature to the comparative properties of Examples 1 and 2, respectively.

The gel times of the molding compositions of the examples are determined by the following procedure. A 0.5–1.0 gram sample of the composition to be tested is placed on a hot plate at 350° F, and a timer is simultaneously started. The material is moved along the heated plate with a spatula. The initial gel time is when there is a significant increase in viscosity and the sheen of the molten material starts to disappear. The final gel time is when the material is completely cured and can no longer be moved along the heated plate.

The following procedure is employed in determining the hot hardness or hot strength of the molding compounds. A 50 gram sample of the composition to be tested is charged to a transfer pot and then transferred to a two-cavity mold which produces bars 4 inches ×

1 inch × ⅛ inch under 800 psi pressure. The mold and press having been preheated to 350° F. The material is then cured for 2½ minutes. After curing, the mold is opened and within 5 seconds the indentation hardness using a Shore D durometer is measured. The same test is repeated except that the cure time is 1½ minutes.

The following procedure is employed to determine the Hull spiral flow. A 20 gram sample of the composition to be tested is charged to a transfer pot with a diameter of 1.25–1.75 inches and the transfer cycle is immediately activated. The material is molded in the flow tester mold for 1 minute at 350° F at a pressure of 809 psi. The mold is then opened and the flow of the composition is measured in inches.

I claim:

1. A composition comprising (a) an uncured silicone resin containing at least 0.25 percent by weight of silicon-bonded groups selected from the class consisting of hydroxyl groups, lower alkoxy groups, and mixtures thereof of the average unit formula, $$(OH)_q(OR)_rR_sSiO_{4-q-r-s/2},$$

where $R$ is selected from the class comprising lower alkyl radicals having one to eight carbon atoms; cycloalkyl radicals having five to seven carbon atoms in the ring; lower alkenyl radicals having two to eight carbon atoms; mononuclear aryl radicals; mononuclear aryl lower alkyl radicals having one to six carbon atoms in the alkyl group; and halogenated derivatives of the above radicals; (OR) is a lower alkoxy radical containing from one to eight carbon atoms per radical; $q$ has a value of 0 to 1.0, $r$ has a value of 0 to 1.0; $s$ has a value of 1.0 to 1.8; and the sum of $q + r$ has a value of 0.01 to 1.0; and a catalytic amount of (b) a catalyst system comprising,
  1. from about 0.01 to about 5 percent by weight based upon the total weight of (a) and (b) of a lead compound selected from the group lead carbonate, lead monoxide, and mixtures thereof; and
  2. carboxylic acid anhydride in an amount sufficient to supply at least about 0.25 carboxylic acid anhydride groups per mole of (1)

wherein said uncured silicone resin is prepared by the process comprising, in combination, the steps of,
A. agitating a mixture of
  3. organohalosilane,
  4. from about 1.7 parts to about 10 parts by weight of water, per part of organohalosilane,
  5. from about 0.2 to about 5 parts by weight of acetone, per part of organohalosilane,
  6. from about 0.3 part to about 5 parts by weight of a water immiscible organic solvent, per part of organohalosilane, and
  7. from 0 to about one mole of an aliphatic monohydric alcohol having from one to eight carbon atoms, per mole of halogen attached to the silicon of the organohalosilane,
B. separating an organic solvent solution of an uncured silicone resin having an average ratio from about 1 to 1.8 organo radicals per silicon atom from the resulting hydrolysis mixture, said organohalosilane being selected from the group consisting of,
  8. organotrihalosilane,
  9. a mixture of organotrihalosilane and diorganodihalosilane,
  10. a reaction product of an aliphatic monohydric alcohol having from one to eight carbon atoms and a member selected from the group consisting of organotrihalosilane, and a mixture of organotrihalosilane and diorganodihalosilanes; which reaction product has an average ratio of up to one alkoxy radical per halogen radical,
  11. a mixture of the reaction product of (10) and a member selected from the organotrihalosilane and diorganodihalosilane, and where the organo radicals of the organohalosilane and said uncured silicone resin are attached to silicon by carbon-silicon linkages and are selected from the group consisting of the radicals defined by $R$ hereinabove.

2. The composition of claim 1 wherein said lead compound is present in an amount from about 0.1 to about 1 percent by weight based upon the total weight of (a) and (b).

3. The composition of claim 1 wherein the anhydride is present in an amount sufficient to provide at least about 0.35 carboxylic acid anhydride groups per mole of lead compound.

4. The composition of claim 1 wherein $q$ has a value of 0.2 to 0.55; $r$ has a value of 0.2 to 0.55; $s$ has a value of 1.05 to 1.45.

5. The composition of claim 1 wherein the resin contains from 4 to 12 percent of silicon-bonded groups selected from the class consisting of hydroxyl groups and alkoxy groups.

6. The composition of claim 1 further characterized by the addition of from about 0.5 percent to about 10 percent by weight based upon the total weight of the siloxane resin of at least one material selected from the group consisting of
  1. a silane of the formula $$R_t^3(OH)_u(OR^3)_vSi$$

wherein $R^3$ is selected from the group consisting of lower alkyl radicals having one to eight carbon atoms; cycloalkyl radicals having five to seven carbon atoms in the ring; lower alkenyl radicals having two to eight carbon atoms; mononuclear aryl radicals; mononuclear aryl lower alkyl radicals having one to six carbon atoms in the alkyl group; and halogenated derivatives of the above radicals; $OR^3$ is a lower alkoxy radical containing from one to eight carbon atoms per radical; $t$ has a value of 1 to 3; $u$ has a value of 0 to 3; $v$ has a value of 0 to 3; and the sum of $u + v$ has a value of 1 to 3;
  2. a siloxane fluid having the average unit formula, $$R_x^4(HO)_y(OR^4)_zSiO_{4-x-y-z/2}$$

where $R^4$ and $(OR^4)$ are defined as $R^3$ and $(OR^3)$, respectively are defined above; $x$ has a value of 1 to 3 and where $x$ has a value of less than 1.8 there are at least 5 percent by weight based upon the weight of the siloxane compound of HO and $(OR^4)$ groups in the siloxane compound; $y$ has a value of 0 to 2; $z$ has a value of 0 to 2, and the sum of $y + z$ has a value of 0.02 to 2; and
  3. mixtures thereof.

7. The composition of claim 1 wherein the sum of $q + r$ has a value of 0.2 to 0.55.

8. A composition comprising
  a. an uncured silicone resin containing at least 0.25 percent by weight of silicon-bonded groups selected from the class consisting of hydroxyl groups, lower alkoxy groups, and mixtures thereof of the average unit formula,

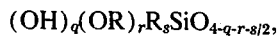

where R is selected from the class comprising lower alkyl radicals having one to eight carbon atoms; cycloalkyl radicals having five to seven carbon atoms in the ring; lower alkenyl radicals having two to eight carbon atoms; mononuclear aryl radicals; mononuclear aryl lower alkyl radicals having one to six carbon atoms in the alkyl group; and halogenated derivatives of the above radicals; (OR) is a lower alkoxy radical containing from one to eight carbon atoms per radical; $q$ has a value of 0 to 1.0; $r$ has a value of 0 to 1.0; $s$ has a value of 1.0 to 1.8; and the sum of $q + r$ has a value of 0.01 to 1.0; and a catalytic amount of b. a catalytst system comprising,
  1. from about 0.01 to about 5 percent by weight based upon the total weight of (a) and (b) of a lead compound selected from the group consisting of lead carbonate, lead monoxide, and mixtures thereof; and
  2. a carboxylic acid anhydride in an amount sufficient to supply at least about 0.25 carboxylic acid anhydride groups per mole of (1);
c. from about 0.5 percent to about 10 percent by weight based upon the total weight of the siloxane resin (a) of at least one material selected from the group consisting of
  i. a silane of the formula

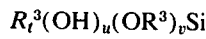

where $R^3$ is selected from the group consisting of lower alkyl radicals having one to eight carbon atoms; cycloalkyl radicals having from five to seven carbon atoms in the ring; lower alkenyl radicals having two to eight carbon atoms; mononuclear aryl radicals; mononuclear aryl lower alkyl radicals having one to six carbon atoms in the alkyl group; and halogenated derivatives of the above radicals; $OR^3$ is a lower alkoxy radical containing from one to eight carbon atoms per radical; $t$ has a value of 1 to 3, $u$ has a value of 0 to 3; $v$ has a value of 0 to 3; and the sum of $u + v$ has a value of 1 to 3;
  ii. a siloxane fluid having the average unit formula,

where $R^4$ and $(OR^4)$ are defined as $R^3$ and $(OR^3)$, respectively above, $x$ has a value of 1 to 3 and where $x$ has a value of less than 1.8 there are at least 5 percent by weight based on the weight of the siloxane compound of HO and $(OR^4)$ groups in the siloxane compound; $y$ has a value of 0 to 2; $z$ has a value of 0 to 2; and the sum of $y + z$ has a value of 0.02 to 2; and
  iii. mixtures thereof; and
d. a filler, and wherein said uncured silicone resin (a) is prepared by the process comprising, in combination, the steps of,
A. agitating a mixture of
  3. an organohalosilane,
  4. from about 1.7 parts to about 10 parts by weight of water, per part of organohalosilane,
  5. from about 0.2 to about 5 parts by weight of acetone, per part of organohalosilane,
  6. from about 0.3 to about 5 parts by weight of a water immiscible organic solvent per part of organohalosilane, and
  7. from 0 to about one mole of an aliphatic monohydric alcohol having from one to eight carbon atoms, per mole of halogen attached to the silicon of the organohalosilane,
B. separating an organic solvent solution of an uncured silicone resin having an average ratio from about 1 to 1.8 organo radicals per silicon atom from the resulting hydrolysis mixture, said organohalosilane being selected from the group consisting of
  8. an organotrihalosilane,
  9. a mixture of organotrihalosilane and diorganodihalosilane
  10. a reaction product of an aliphatic monohydric alcohol having from one to eight carbon atoms and a member selected from the group consisting of organotrihalosilane, and a mixture of organotrihalosilane and diorganodihalosilanes; which reaction product has an average ratio of up to one alkoxy radical per halogen radical,
  11. a mixture of the reaction product of (10) and a member selected from the organotrihalosilane and diorganodihalosilane, and where the organo radicals of the organohalosilane and said uncured siloxane resin are attached to silicon by carbon-silicon linkages and are selected from the group consisting of the radicals defined by R hereinabove.

* * * * *